Oct. 27, 1970
B. B. WIGGINS ET AL
3,535,937
PIPE PRESSURE MEASURING APPARATUS
Filed Dec. 31, 1968
2 Sheets-Sheet 1
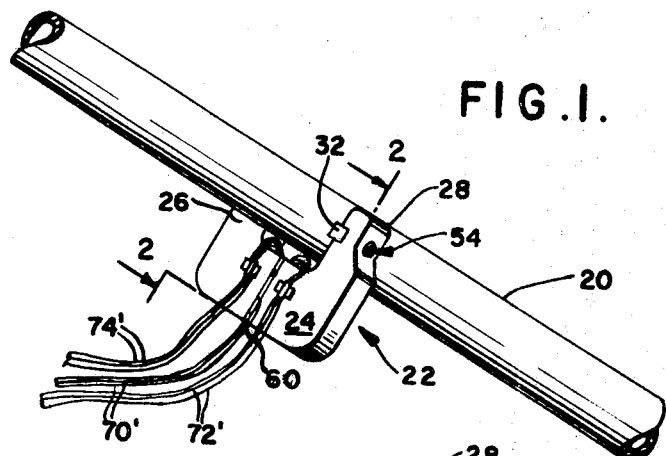
FIG.I.
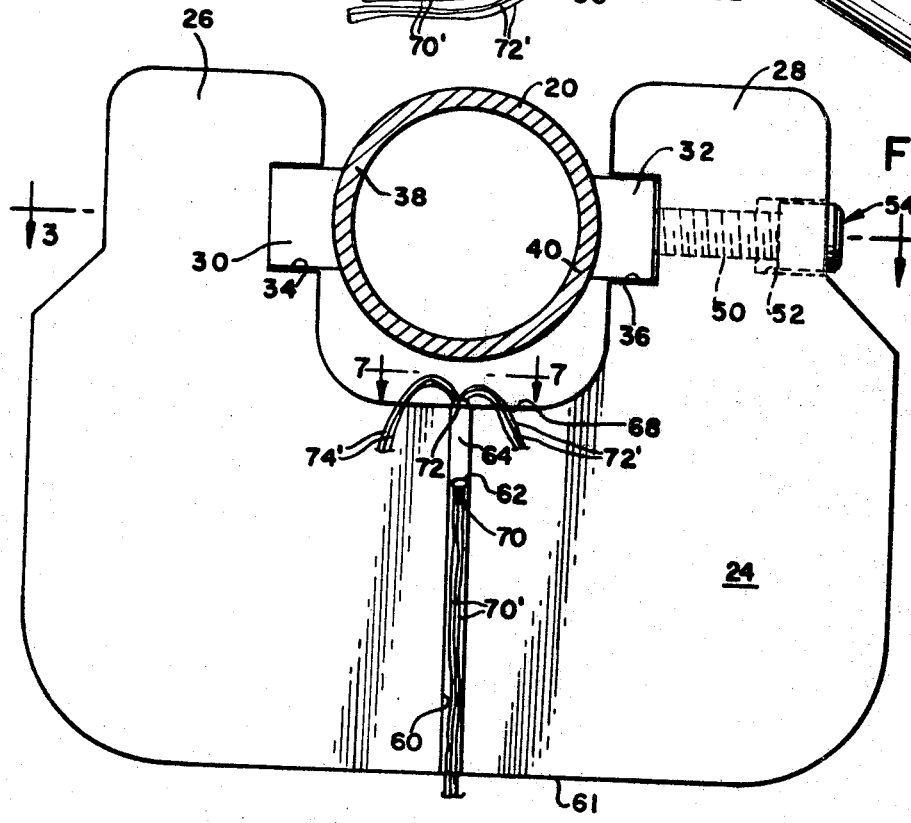
FIG.2.
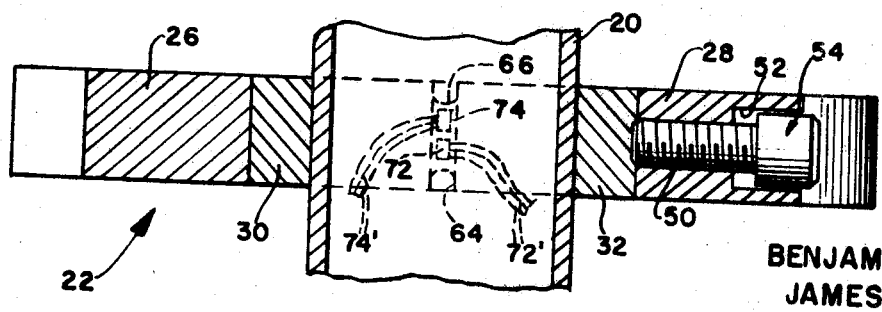
FIG.3.
INVENTORS
BENJAMIN B. WIGGINS
JAMES P. BAILEY &
WILLIAM M. HART
BY *Shoemaker and Mattare*
ATTORNEYS

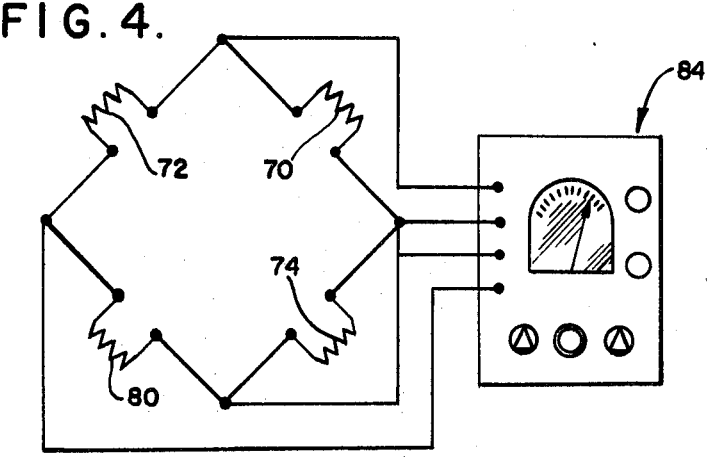
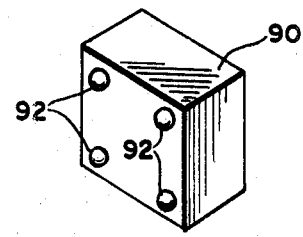
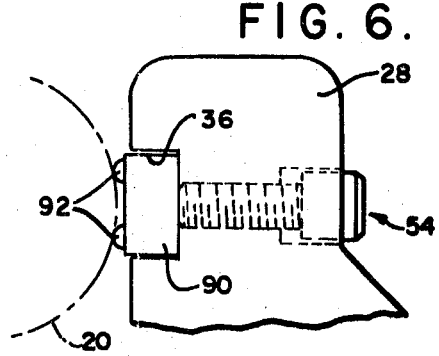
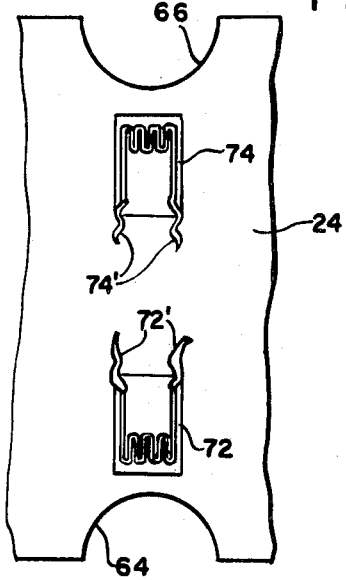
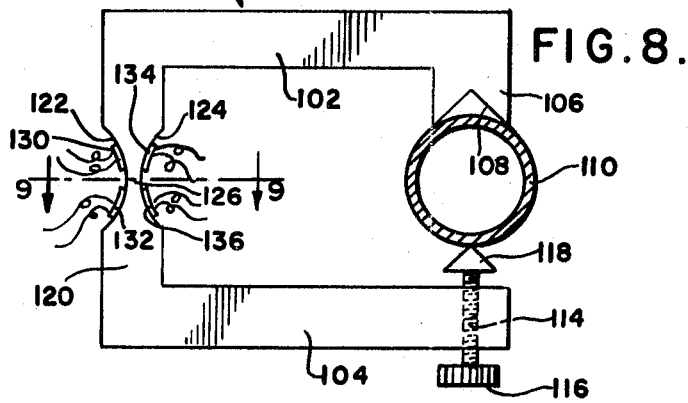
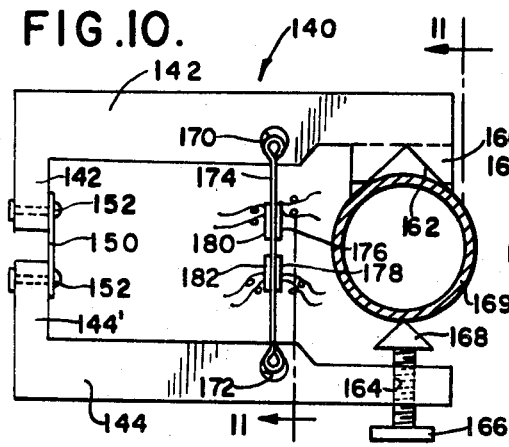
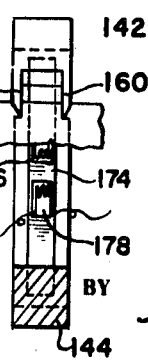

United States Patent Office 3,535,937
Patented Oct. 27, 1970

3,535,937
PIPE PRESSURE MEASURING APPARATUS
Benjamin B. Wiggins, Raleigh, N.C., James P. Bailey, Yorktown, and William M. Hart, Newport News, Va., assignors to Newport News Shipbuilding and Dry Dock Company, Newport News, Va., a corporation of Virginia
Filed Dec. 31, 1968, Ser. No. 788,310
Int. Cl. G01l 9/04
U.S. Cl. 73—398                                    23 Claims

ABSTRACT OF THE DISCLOSURE

A pair of spaced generally parallel clamping arms are provided and are interconnected by a connecting portion which allows movement of the arms toward and away from one another. Clamping means including pipe engaging portions are mounted at the outer ends of the arms for clamping a pipe therebetween. Strain gauges are connected between the arms and are subjected to strain upon movement of the arms away from one another in response to expansion of the associated pipe under pressure. These strain gauges are connected in an electrical circuit including an indicating means.

Background of the invention

The present invention relates to apparatus for measuring pressure within a pipe. In the past, variations of internal pressure in a pipe are ordinarily monitored by a permanently installed conventional pressure gauge.

Conventional pressure gauges are difficult to mount in operative position on a pipe and furthermore are not readily adaptable to different sizes of pipe. Accordingly, it is an objective of the present invention to provide an apparatus overcoming these disadvantages.

Summary of the invention

When a pipe is subjected to internal pressure, the pipe will have a certain amount of diametrical expansion in accordance with the internal pressure. The apparatus of the present invention is adapted to measure this diametrical expansion and to convert this expansion into an electrical signal which is proportional to the amount of pressure developed within the pipe.

Since the amount of diametrical expansion of the pipe is very small, an arrangement is provided for converting the diametrical expansion into a bending moment, and strain gauges are suitably mounted on the apparatus for measuring the strain developed, thereby maximizing the readable strain.

The construction of the present invention concentrates most of the stress in a relatively small area and limits the losses due to shear and bending in other areas of the apparatus. The structure is generally U-shaped in construction, and includes a pair of spaced substantially parallel arms having clamping means thereon so that the apparatus can be readily clamped on an associated pipe. This facilitates mounting of the device, and furthermore the adjustable clamping means enables the device to be readily adapted to pipes of different size.

The construction of the present invention also provides protection for the strain gauges and enables the application of an initial load for clamping and seating the apparatus on an associated pipe so that it will be properly positioned during operation.

The entire device is preferably made of aluminum so that the force exerted on the pipe by the clamping means is not so great as to appreciably restrict the diametrical expansion of the pipe.

The pressure measuring apparatus of the present invention is particularly useful in detecting pressure discontinuities such as blockages or malfunctioning valves in a complex piping system which may include one or more valves. The apparatus may be employed for measuring the pressure difference from one side of the point of blockage to the other side thereof simply and quickly. The piping of the system does not have to be disassembled in order to find the blockage. Conventional pressure gauges would have to be tapped into the piping, and this would be a prohibitive procedure. On the other hand, the apparatus of the present invention can be easily moved to many different points in the system. Additionally, the apparatus of the present invention is independent of flow conditions existing within a piping system.

Accordingly, a method is provided for measuring pressure discontinuities in a complex piping system. At least one or a plurality of gauges may be placed at strategic points in the piping system. The gauges may then be measured in turn. A plurality of gauges would simplify the procedure and avoid the necessity of moving the gauges about, pressurizing and depressurizing the system each time.

Brief description of the drawings

FIG. 1 is a perspective view illustrating a first form of the apparatus clamped in operative position on a pipe;

FIG. 2 is a sectional view taken substantially along line 2—2 of FIG. 1 looking in the direction of the arrows;

FIG. 3 is a sectional view taken substantially along line 3—3 of FIG. 2 looking in the direction of the arrows;

FIG. 4 is a schematic wiring diagram illustrating an electrical circuit employed with the present invention;

FIG. 5 is a top perspective view of one form of removable insert employed with the apparatus shown in FIGS. 1–3;

FIG. 6 illustrates the manner in which the insert shown in FIG. 5 is employed with the associated structure;

FIG. 7 is an enlarged view taken substantially along line 7—7 of FIG. 2 looking in the direction of the arrows;

FIG. 8 is a front view of a modified form of the apparatus;

FIG. 9 is a sectional view taken substantially along line 9—9 of FIG. 8 looking in the direction of the arrows;

FIG. 10 is a front view of still another form of the present invention; and

FIG. 11 is a sectional view taken substantially along line 11—11 of FIG. 10 looking in the direction of the arrows.

Description of the preferred embodiments

Referring now to the drawings wherein like reference characters designate corresponding parts throughout the several views, a first form of the invention is illustrated in FIGS. 1–3 inclusive. As seen in these figures, a cylindrical pipe 20 of conventional construction is provided, and the apparatus of the present invention is indicated generally by reference numeral 22. The apparatus 22 includes a generally U-shaped one-piece body of material 24 of aluminum or the like defining a pair of spaced substantially parallel arms 26 and 28 extending therefrom.

A pair of removable inserts 30 and 32 are slidably positioned within slots 34 and 36 formed in the facing opposed surfaces of the two arms 26 and 28 respectively. Inserts 30 and 32 have curved inner surfaces 38 and 40 respectively which are complementary to the outer surface of pipe 20 so as to fit snugly thereabout. It is apparent that the curvature of the inner surfaces of these inserts may be varied according to the size of the associated pipe.

Each of these inserts comprise a portion of the clamping means supported by the two arms for clamping the pipe therebetween. The clamping means includes a threaded hole 50 extending laterally through arm 28, this hole being counterbored as indicated at 52. A socket head set screw 54 is threaded into hole 50 and engages insert 32. It is apparent that the amount of pressure applied by the clamping means may be adjusted by means of set screw 54.

An elongated notch 60 is formed completely through the thickness of body 24 and opens through the surface 61 thereof. The notch terminates in an arcuate surface 62. A pair of semi-cylindrical recesses 64 and 66 are provided in opposite surfaces of the body member. It will be noted that the two arms 26 and 28 are interconnected with one another by the portion of the body defined between recesses 64, 66 and surfaces 62, 68. Accordingly, the arms are interconnected by a connecting portion of greatly reduced area as compared with the arms themselves. This enables bending moments to be developed in this connecting portion upon movement of the two arms 26 and 28 away from one another upon diametrical expansion of an associated pipe.

The measuring means of the present invention includes a plurality of strain gauges. A first strain gauge 70 is mounted by suitable adhesive means or the like to surface 62. This strain gauge may be of conventional construction and will be in compression upon movement of the arms of the apparatus away from one another. A pair of leads 70' are connected with strain gauge 70 and are adapted to be connected in an electrical circuit as hereinafter described.

A pair of strain gauges 72 and 74 are mounted on surface 68 of body member 24 by suitable adhesive means or the like and are disposed at the opposite side of the connecting portion from strain gauge 70. Strain gauges 72 and 74 are of conventional construction and will be in tension upon movement of arms 26 and 28 away from one another. A pair of leads 72' are connected with strain gauge 72, and a pair of leads 74' are connected with strain gauge 74, these leads being connected in an electrical circuit hereinafter described. The leads may be suitably taped or otherwise secured to the body member to maintain them in proper position.

Referring now to FIG. 4, an electrical circuit according to the present invention is illustrated. The three strain gauges previously identified by reference characters 70, 72 and 74 are illustrated as connected in a Wheatstone bridge circuit along with a dummy gauge 80 mounted on a similar piece of material to complete the circuit. This Wheatstone bridge circuit is connected with a conventional strain indicator 84, e.g., Hathaway, which will provide a visible reading which can be translated into an internal pressure after suitable calibration of the apparatus.

Referring now to FIGS. 5 and 6, a modified form of insert for use with the apparatus shown in FIGS. 1–3 is indicated. This form of insert includes a body portion 90 adapted to be slidably received within the slot 36 in arm 28 of the apparatus and movable by means of set screw 54 for clamping an associated pipe. A plurality of spherical members 92 such as ball bearings or the like are retained in suitable holes provided in member 90. These ball bearings are illustrated as being four in number, and as seen in FIG. 6 will readily conform to and accommodate a pipe. These spaced ball bearings are adapted to properly engage pipes of different diameters so as to provide maximum versatility.

Referring now to FIG. 8, a modified form of the invention is illustrated. As seen in this figure, the apparatus 100 includes a pair of spaced generally parallel arms 102 and 104. Arm 102 terminates in a normally extending end portion 106 having a notch 108 formed therein for engaging and clamping one side of an associated pipe 110.

The outer end of the opposite arm 104 has a threaded hole 114 extending therethrough receiving a threaded screw 116 having a pointed end portion 118 adapted to engage and clamp the opposite side of the pipe whereby the pipe is positively clamped by portions 108 and 118 disposed at opposite sides thereof.

The apparatus includes a connecting portion 120 having cutouts 122 and 124 formed in opposite sides thereof to define an intermediate connecting portion 126 of considerably reduced area so that bending moments will be effectively developed in this connecting portion.

A first pair of strain gauges 130 and 132 are suitably mounted by an adhesive or the like within cutout 122, and a second pair of strain gauges 134 and 136 are similarly mounted within the opposite cutout 124. These four strain gauges may be connected in a Wheatstone bridge such as that illustrated in FIG. 4 for measuring the amount of pressure existing within the associated pipe.

Referring now to FIGS. 10 and 11 of the drawings, still another form of the invention is illustrated. The apparatus is indicated generally by reference numeral 140 and includes a pair of spaced generally parallel arms 142 and 144. These arms include normally extending portions 142' and 144' respectively which are interconnected by a member 150 secured to the associated portion by mechanical fasteners 152. Member 150 may comprise a strip of spring steel such as .05" feeler gauge stock and the like. Member 150 serves as a hinge means for interconnecting the two arms 142 and 144 for swinging movement with respect to one another with no slack.

A pair of spaced portions 160 are provided at the outer end of arm 142 and extend normally therefrom, each of these portions 160 having a notch 162 formed therein for engaging and clamping one side of an associated pipe.

A threaded hole 164 is formed through the outer end of arm 144 and receives a threaded screw 166 having a pointed end 168 formed thereon for engaging the opposite side of an associated pipe 169 to clamp the apparatus on a pipe as illustrated.

Arms 142 and 144 have tapered holes 170 and 172 formed therein respectively opening through the opposed facing surfaces of the two arms. These holes are adapted to receive enlarged curled and permanently deformed end portions of a deformable resilient member 174 which may be formed of .005" feeler gauge stock or the like. It is apparent that the holes 170 and 172 enable the deformable member 174 to be slid into the operative position shown, and outward movement of the two arms 142 and 144 away from one another will cause deformation of member 174.

A first pair of strain gauges 176 and 178 are suitably secured as by an adhesive substance or the like to one surface of member 174, and a second plurality of strain gauges 180 and 182 are suitably connected in a similar manner to the opposite surface of member 174. All of these strain gauges may be connected in a Wheatstone bridge circuit as shown in FIG. 4 for measuring the pressure existing within an associated pipe.

Since the apparatus of the present invention can be quickly and easily mounted upon the exterior of the pipes in a complex piping system, the apparatus may be utilized in a method of measuring pressure discontinuities in a complex piping system. Pressure differences from one side of a blockage to another or pressure differentials existing on opposite sides of a malfunctioning valve can be readily detected from the exterior of the system without the necessity of tapping in a conventional pressure gauge.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Pipe pressure measuring apparatus including a pair of spaced clamping arms, means joining said clamping arms for allowing movement of said arms toward and away from one another, readily releasable clamping means on said arms and including pipe engaging portions for clamping a pipe between said arms, said readily releasable clamping means enabling said pipe pressure measuring apparatus to be readily moved and positioned along said pipe, measuring means including strain gauge means connected between said arms and responsive to movement of said arms, and indicating means for indicating the pressure within said pipe connected with said strain gauge means.

2. Apparatus as defined in claim 1 wherein said clamping arms extend substantially parallel with one another.

3. Apparatus as defined in claim 1 including adjusting means for adjusting a portion of the clamping means to adjust the amount of applied pressure.

4. Apparatus as defined in claim 1 wherein said means joining said arms comprises a connecting portion of reduced area compared with said clamping arms, said connecting portion being subjected to bending moments when said arms move away from one another.

5. Apparatus as defined in claim 1 wherein said means joining said arms is positioned substantially midway between the outer ends of said clamping arms.

6. Apparatus as defined in claim 1 wherein said strain gauge means comprises a plurality of individual strain gauges, at least one of said strain gauges being in tension upon movement of said arms, and at least another of said strain gauges being in compression upon movement of said arms.

7. Apparatus as defined in claim 6 wherein each of said strain gauges is connected in a bridge circuit, said bridge circuit being connected with said indicating means.

8. Apparatus as defined in claim 1 wherein said clamping arms and said means joining said arms comprise a substantially U-shaped one-piece construction.

9. Apparatus as defined in claim 8 wherein said means joining said arms has a notch formed therein.

10. Apparatus as defined in claim 9 wherein said strain gauge means includes at least one strain gauge disposed in said notch.

11. Apparatus as defined in claim 10 including at least another strain gauge mounted on said means joining said arms opposite said notch.

12. Apparatus as defined in claim 1 including removable inserts mounted in said arms for engaging an associated pipe.

13. Apparatus as defined in claim 12 wherein said inserts have curved surfaces adapted to fit against the outer surface of an associated pipe.

14. Apparatus as defined in claim 12 wherein each of said inserts has a plurality of spherical members mounted thereon to enable the inserts to accommodate a pipe.

15. Apparatus as defined in claim 1 wherein said arms and said means joining said arms define a substantially U-shaped one-piece construction, said means joining said arms having recesses formed on opposite sides thereof, said strain gauge means including at least one strain gauge disposed within each of said recesses.

16. Apparatus as defined in claim 1 wherein said means joining said arms includes a hinge means.

17. Apparatus as defined in claim 16 wherein said hinge means comprises a flat strip of resilient material.

18. Apparatus as defined in claim 17 including a deformable member having the opposite ends thereof connected with said arms, said strain gauge means being mounted on said deformable member.

19. Apparatus as defined in claim 18 wherein said strain gauge means includes a plurality of strain gauges, at least one strain gauge being mounted on each of the opposite sides of said deformable member.

20. Apparatus as defined in claim 19 wherein said deformable member comprises a flat strip of resilient material.

21. The method of measuring pressure in a piping system comprising the steps of:
 (a) clamping a readily releasable and movable measuring apparatus on the outer surface of a pipe in the piping system at a particular point therein;
 (b) detecting deflection of the pipe wall caused by pressure within said pipe at said point; and
 (c) measuring the pressure within said pipe at said point as a function of said pipe wall deflection at said point, said measuring apparatus being readily movable to other points in said piping system and clamped to the pipe point to measure the pressure at such other point.

22. The method as defined in claim 21, wherein:
 (a) at least one additional measuring apparatus is clamped to said piping system at a point spaced from said first-mentioned measuring apparatus for measuring pressure within said pipe at such other point as a function of pipe wall deflection at said other point.

23. The method as defined in claim 21 wherein:
 (a) said measuring apparatus is attached to said pipe wall in a manner not to disturb said piping system or to puncture or otherwise deform said pipe wall and said pressure is measured as a function of diametrical expansion of said pipe wall.

References Cited

UNITED STATES PATENTS

| | | | |
|---|---|---|---|
| 1,999,771 | 4/1935 | Mample | 73—420 |
| 2,419,061 | 4/1947 | Emery | 73—398 XR |
| 2,568,940 | 9/1951 | Wolf | 73—88.5 |
| 2,826,062 | 3/1958 | Brown et al. | 73—88.5 XR |
| 2,880,409 | 3/1959 | Galentine | 73—88.5 XR |
| 3,102,427 | 9/1963 | Trostel | 73—420 |

OTHER REFERENCES

Leeman et al., "A Compressometer For Obtaining Stress-Strain Curves of Rock Specimens Up to Fracture," Journal of Scientific Instruments, vol. 34, July 1957, pp. 279 and 280.

DONALD O. WOODIEL, Primary Examiner

U.S. Cl. X.R.

73—141

Notice of Adverse Decision in Interference

In Interference No. 97,742 involving Patent No. 3,535,937, B. B. Wiggins, J. P. Bailey and W. M. Hart, PIPE PRESSURE MEASURING APPARATUS, final judgment adverse to the patentees was rendered Mar. 20, 1974, as to claims 1, 2, 3, 5, 6, 7, 8, 21 and 23.

[*Official Gazette of September 24, 1974.*]